United States Patent Office 3,535,274
Patented Oct. 20, 1970

3,535,274
HIGH MOLECULAR WEIGHT POLYURETHANES PREPARED FROM (A) A POLYISOCYANATE, (B) A MONOFUNCTIONAL TERTIARY AMINO COMPOUND, AND (C) A MONOFUNCTIONAL COMPOUND CONTAINING HALOGEN ATOMS OR SULFURIC ACID ESTER GROUPS
Dieter Dieterich, Otto Bayer, and Erwin Muller, Leverkusen, Germany, assignors to Farbenfabriken Bayer Aktiengesellschaft, Leverkusen, Germany, a German corporation
No Drawing. Filed Jan. 7, 1965, Ser. No. 424,120
Claims priority, application Germany, Jan. 10, 1964,
F 41,707
Int. Cl. C08g 22/08, 22/44
U.S. Cl. 260—2.5
6 Claims

ABSTRACT OF THE DISCLOSURE

A method for making a polyurethane by reacting an organic compound having one active hydrogen atom reactive with an NCO group and containing at least one tertiary amino group, an organic polyisocyanate and a second organic compound having one active hydrogen atom reactive with an NCO group and containing at least one halogen atom or sulfuric acid ester group.

This invention relates to polyurethane plastics, and more particularly to high molecular polyurethane plastics prepared from monofunctional constituents.

Since the introduction of polyurethanes into the world of plastics, they have been an important and often utilized type of plastic composition. Such polyurethanes are conventionally prepared by the reaction between a polyisocyanate of one type or another with a compound containing at least two active hydrogen containing groups as determined by the Zerewitinoff method which active hydrogen atoms are reactive with the NCO groups of the polyisocyanate. For the production of soluble, linear polyurethanes of high molecular weight, aminoalcohols, diamines or diols of higher or lower molecular weight are reacted with approximately equivalent quantities of diisocyanate. If higher functional reactants are used, cross-linked insoluble polyurethane compositions are formed. In this manner, high, medium or low molecular weight polyurethanes can be prepared by stopping the polyaddition process between the polyisocyanate and the active hydrogen containing compound at any desired point with the addition of a monofunctional reactant, generally a monoalcohol or some other such similar suitable material, to terminate the formation of the polyurethane chain. Consequently, it is possible to prepare polyurethanes having as high a molecular weight as is desired simply by allowing the polyaddition process to continue without chain stopping it.

Therefore, where high molecular weight polyurethanes are to be prepared, the use of monofunctional active hydrogen-containing compounds is out of the question. It can be readily understood that it is impossible to prepare high molecular weight polyurethanes, especially linear and highly elastic polyurethanes, with the use of a monofunctional reactant, which, as already mentioned, is generally only used for chain termination purposes since, the one reactive group having been used up, no second active group is available to allow the chain to develop further.

It is therefore an object of this invention to define a method for the preparation of high molecular weight polyurethanes from monofunctional reactants.

It is a further object of this invention to define a method for the preparation of hydrophilic and antistatic polymers having a high molecular weight and derived from a compound which is monofunctional.

Still another object of this invention is to prepare polyurethane polymers which readily form dispersions and solutions in water.

A still further object of this invention is to prepare a polyurethane which is hard or soft, thermoplastic or elastic, and porous or non-porous by the reaction between a polyisocyanate and a monofunctional reactant containing hydrogen atoms which are reactive with NCO groups.

The foregoing objects and others are accomplished in accordance with this invention, generally speaking, by providing a method for the preparation of a polyurethane which comprises reacting an organic compound having one active hydrogen atom which is reactive with an NCO group and which contains at least one tertiary amino group, an organic polyisocyanate, and a second organic compound having one active hydrogen atom which is reactive with an NCO group and which contains at least one halogen atom or sulfuric acid ester group.

One of the greatest advantages of the polyurethanes prepared by this method is that they are capable of being dispersed or dissolved in water. Therefore, in addition to being able to prepare high molecular weight polyurethane polymers from monofunctional reactants, because of the presence of the quaternary nitrogen groups, the high molecular weight polymers can readily be dispersed or dissolved in aqueous solutions. As a consequence, these high molecular weight polyurethane polymers can be used in applications from which they would otherwise be barred by their inability to dissolve in water.

Further, depending on the reactants employed and the proportions in which they are used, it is possible to prepare soft or hard, thermoplastic or elastic polyurethane products of a relatively high molecular weight which may be cross-linked by any suitable method using compounds such as formaldehyde, sulfur, peroxides, polyisocyanates, and the like. The polyurethanes produced are so versatile that they may be processed by any desired method such as, for example, casting, injection-molding, extrusion, vulcanization processes such as are used in the rubber industry, and so on. As has already been explained, the polyurethanes prepared by the process of this invention have a hydrophilic nature, the degree of which depends on the number of quaternary ammonium groups in the molecule. In addition to that, the polymers possess antistatic characteristics making them particularly useful as antistatic and crease-resistant coatings or furnishings for fibres and textiles. A further advantage of the polyurethanes prepared according to the method outlined herein, is that they are particularly resistant to the degradation of gasoline, benzene, halogenated hydrocarbons and the like.

That polyurethanes having such advantageous properties may be prepared from monofunctional constituents heretofore incapable of being utilized in the preparation of a higher molecular weight polymer except as a chain stopper is a further unexpected and advantageous result. In addition to the use of those compounds which contain one hydrogen atom which is reactive with NCO groups, compounds which contain no hydrogen atoms which are reactive with NCO groups can be used in conjunction therewith to prepare the high molecular weight polyurethanes as long as these compounds carry at least two groups which can participate in a quaternization reaction. In such a case, as in the case where only compounds having one hydrogen atom which is reactive with NCO groups are employed, the polyurethane is formed by two alternating reactions; that is, an isocyanate addition reaction and an addition by quaternization.

The sequence in which the reaction components are combined is not critical. According to one embodiment preferred in the practice of this invention, however, the process is carried out in two stages. In the first step, an initial adduct is prepared from at least two organic compounds, one of which contains the tertiary nitrogen atom or atoms while the other compound contains the quaternizing group or groups, so that an organic compound containing at least two hydrogen atoms which are reactive with NCO groups is obtained. Some typical initial adducts thus prepared are, for example:

I 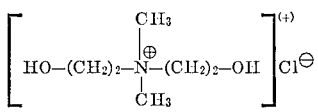

II 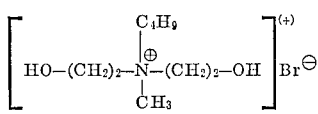

III 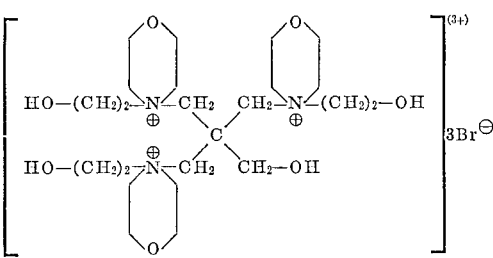

It is to be understood that such initial adducts can also be formed from components other than those described above. As an example, considering Compound II, N-methyl diethanolamine and butyl bromide, N-butyl diethanolamine and methyl bromide, as well as ethylene bromhydrin and N-butyl-N-methyl-aminoethanol and the like may be used in the preparation of the adduct. As Compound II can thus be easily made from a wide variety of components, so can any other type of adduct, only a few examples of which are given above. In the second step, the adduct is reacted with the polyisocyanate.

In the practice of this invention any suitable monohydric alcohol substituted by halogen atoms or sulphuric acid ester groups may be used. Some such suitable compounds are, for example, beta-chloroethanol, beta-bromoethanol, gamma-bromopropanol, 6-bromohexanol, 2-bromohexanol, 3-chlorobutanol, beta-iodoethanol, 2-iodohexanol, 3-iodobutanol, 1,3-diiodo-2-propanol, ethylene glycolmonobenzene sulphonate, 1,3-dichloro-2-propanol, 1,3-dibromo-2-propanol, 2,2-bis chloromethyl propanol, pentaerythritol - tris - chlorhydrin, pentaerythritol - tris-bromhydrin, chloromethyl cyclohexanol, bis-chloromethyl benzyl alcohol, 4-chloromethyl hydroxyethyl phenol ether, pentaerythritol-tris-ethane sulphonate, glycerine-bis-toluenesulphonate.

Any suitable tertiary amino alcohol may be used in the practice of this invention. Some such suitable compounds are, for example, dimethylamino-ethanol, diethylaminoethanol, dibutylaminoethanol, N-methyl-N-butylaminoethanol, piperidinoethanol, morpholinoethanol, dimethylaminopropanol, dimethylaminobutanol, 1,6-bis-dimethylamino-2-hexanol, 1,3-diethylamino-2-propanol, 2,2-bis-dimethylaminomethylpropanol.

Any polyisocyanate generally employed in the formation of polyurethanes may be used in the practice of this invention. Some such suitable isocyanates are tetramethylene diisocyanate, hexamethylene diisocyanate, 1,4-phenylene dilisocyanate, 1,3-phenylenediisocyanate, 1,4-cyclohexylenediisocyanate, 2,4-tolylene diisocyanate, 2,5-tolylene diisocyanate, 2,6-tolylene diisocyanate, 3,5-tolylene diisocyanate, 4-chloro-1-3-phenylene diisocyanate, 1-methoxy-2,4-phenylene diisocyanate, 1-methyl-3,5-diethyl-2,6-phenylenediisocyanate, 1,3,5 - triethyl - 2,4-phenylene diisocyanate, 1-methyl - 3,5 - diethyl - 2,4 - phenylene diisocyanate, 1 - methyl-3,5-diethyl-6-chloro-2,4-phenylene diisocyanate, 6 - methyl-2,4-diethyl-5-nitro-1,3-phenylene diisocyanate, para-xylylene diisocyanate, meta-xylylene diisocyanate, 4,6-dimethyl-1,3-xylylene diisocyanate, 1,3-dimethyl-4,6-bis-(betat-isocyanatoethyl) benzene, 3-(alpha-isocyanatoethyl) phenylisocyanate, 1-methyl-2,4-cyclohexylene diisocyanate, 4,4'-biphenylene diisocyanate, 3,3' dimethyl-4,4'-biphenylene diisocyanate, 3,3'-dimethoxy-4,4'-biphenylenediisocyanate, 3,3'-diethoxy-4,4'-biphenylene diisocyanate, 1,1' - bis-(4-isocyanatophenyl)cyclohexane, 4,4' - diisocyanatodiphenylether, 4,4'-diisocyanatodicyclohexylmethane, 4,4' - diisocyanato - diphenylmethane, 4,4'-diisocyanato - 3,3' - dimethyldiphenylmethane, 4,4' - diisocyanato - 3,3' - dichlorodiphenylmethane, 4,4' - diisocyanato-diphenyl-dimethylmethane, 1,5-naphthylene diisocyanate, 1,4-naphthylene diisocyanate, 2,4,4'-triisocyanato - diphenylether, 2,4,6 - triisocyanato - 1 - methyl-3,5-diethylbenzene, ortho-tolidine - 4,4' - diisocyanate, meta-tolidine - 4,4' - diisocyanate, benzophenonone - 4,4'-diisocyanate and the like.

Included in the term polyisocyanate are compounds prepared by the reaction between an excess of a polyisocyanate and an organic compound containing two or more reactive hydrogen atoms as determined by the Zerewitinoff method such as polyhydric alcohols or higher molecular weight polyols such as polyesters and polyethers, polyacetals and the like compounds, a more complete list of examples of which are included in the discussion below.

In addition to the quaternizable compounds by which the polyurethane polymer is built up, any other suitable organic compound containing at least two active hydrogen containing groups as determined by the Zerewitinoff method may be used as a reactant. Some such suitable compounds are, for example, active hydrogen containing compounds which contain any of the following types of active hydrogen containing groups, among others, —OH, —NH$_2$, —NH, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

The molecular weight of the organic compound containing at least two active hydrogen containing groups may vary over a wide range. A satisfactory upper limit for the molecular weight of the organic compound containing at least two active hydrogen containing groups is about 10,000 but this limitation may vary so long as satisfactory mixing of the organic compound containing at least two active hydrogen containing groups with the organic polyisocyanate can be obtained.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethyl-succinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

Any suitable polyhydric polyalkylene ether may be used such as, for example, the condensation product of an alkylene oxide beginning with any suitable initiator. The initiator may be a difunctional compound including water so that the resulting polyether is essentially a chain of repeating alkylene-oxy groups as in polyethylene ether glycol, polypropylene polybutylene ether glycol and the like; or the initiator may be any suitable active hydrogen containing compound which may be a monomer or even a compound having a relatively high molecular weight including other active hydrogen containing compounds as disclosed above. It is preferred that the initiator have from 2 to 8 active sites to which the alkylene oxides may add including for example, amines, alcohols and the like. Any suitable alkylene oxide may be used such as, for example, ethylene oxide, propylene oxide, butylene oxide, amylene oxide, tetrahydrofuran; epihalohydrins such as epichlorohydrin; styrene oxide and the like. Any suitable initiator may be used including, for example, water polyhydric alcohols, preferably having 2 to 8 hydroxyl groups, amines, preferably having 2 to 8 replaceable hydrogen atoms bonded to nitrogen atoms. Phosphorous acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Pats. 1,922,459, 3,009,-939 and 3,061,625 or by the process disclosed by Wurtz in 1859 and in Encyclopedia of Chemical Technology, volume 7, pages 257 to 262, published by Interscience Publishers, Inc. (1951).

Specific examples of initiators are water, ethylene glycol, propylene glycol, glycerine, trimethylol propane, pentaerythritol, arbitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane diamine, p,p',p''-triphenylmethane triamine, ethylene diamine, propylene diamine, propylene triamine, N,N,N',N'-tetrakis-(2-hydroxypropyl) ethylene diamine, diethylene triamine and the like. The phosphorous containing polyols are more fully described below.

Any suitable polyhydric polythioether may be used such as, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Pats. 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like; including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example 2-butyne-1,4-diol, 1,5-hexadiyne-1,6-diol and the like; alkane triols such as for example, 1,3,6-hexanetriol, 1,3,7-heptane triol, 1,4,8-octane triol, 1,6,12-dodecane triol and the like; alkene triols such as 1-hexane-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including for example aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino-5-aminomethyl pyrimidine, 2,5-diamino-1,3,4-thiadiazol and the like.

Phosphorous containing compounds are often advantageously used because of the flame retarding effect which they impart to the resulting plastics. These compounds often contain 1 or 2 phosphorous atoms as a nucleus and then have alkylene oxide side chains bonded to the phosphorous nucleus through either phosphate or phosphite type linkages. The phosphate compounds are advantageously prepared by condensing a mixture of phosphorous pentoxide and water with an alkylene oxide as more particularly set forth above. It is advantageous to use mixtures of phosphorous pentoxide and water which correspond to about 80 percent phosphorous pentoxide and about 20 percent water. But any amount within the range of about 65 percent to 90 percent phosphorous pentoxide and the balance water may be used and the whole range is contemplated. The phosphites are advantageously prepared in accordance with the method of U.S. Pat. 3,009,-929 where triphenyl phosphite, for example, is reacted with a polypropylene ether glycol to prepare a product having a molecular weight of about 500. Other processes are disclosed in the patent. It is also possible to use polyethers based on phosphorous which contain nitrogen atoms in addition to the phosphorous atoms. These compounds may be represented by the general formula

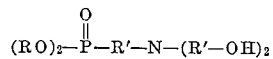

wherein R is lower alkyl or phenyl, for example, methyl, ethyl, propyl, butyl and the like and R' is alkylene, preferably having from 1 to 4 carbon atoms such as, methylene, ethylene, 1,2-propylene, 1,4-butylene and the like. A preferred compound is dioxyethylene - N,N - bis(2-hydroxyethyl)aminomethyl phosphonate.

Any of the compounds of any of the classes set forth above may be substituted with halogen such as, for example, chloro, bromo, iodo and the like; nitro; alkoxy, such as, for example, methoxy, ethoxy, propoxy, butoxy and the like; carboalkoxy such as, for example, carbomethoxy, carbethoxy and the like; dialkyl amino such as, for example, dimethyl amino, dipropyl amino, methylethyl amino and the like; mercapto, carbonyl, thiocarbonyl, phosphoryl, phosphato and the like.

Any suitable chain extending agent containing active hydrogen atoms which are reactive with NCO groups and having a molecular weight less than about 500 may be used such as, for example, ethylene glycol, propylene glycol, butylene glycol, 1,4-butanediol, butenediol, butynediol (xylene glycol, amylene glycol, neopentyl glycol, 2,3 - butanediol, 1,4 - phenylene-bis-(beta-hyroxy ethyl ether), 1,3-phenylene-bis-(beta-hydoxy ethyl ether), bis-(hydroxy methyl - cyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3' - dichlorobenzidene, 3,3'-dinitrobenzidene, 4,4' - methylene - bis(2-chloroaniline), 3,3-dichloro-4,4'-biphenyl diamine, 2,6-diamino pyridine, 4,4'-diamino diphenyl methane, and the like; alkanol amines such as, for example, ethanol amine, aminopropyl alcohol, 2-2-dimethyl propanol amine, 3-amino cyclohexyl alcohol, p-amino benzyl alcohol and the like; water, hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylene-disulfonic acid dihydrazide, omega-amino-caproic acid dihydrazide, gamma-hydroxy butyric hydrazide, bis-semicarbazide, bis-hydrazine carbonic esters of glycols such as many of the glycols heretofore mentioned and the like.

In addition, it is also possible to employ compounds in conjunction with those already mentioned which have several quaternizable groups, such as halogen atoms, sulfonate groups, or tertiary amino groups, but which do not have any hydrogen atoms which can be reacted with isocyanate groups. A few examples of some such suitable compounds are, for example, 1,3-dibromobutane, 1,4-dichlorobutane, 1,4 - dibromobutane, 1,2,3-trichloroisobutane (only two chloro atoms are reactive), 1,6-dibromohexane, 1,3 - dibromo-neopentane, 1,3-bis-chloromethyl-4,6-dimethylbenzene, o-, m- and p-xylylenedichloride, bischloromethyl - naphthalene, bis - chloromethyl-diphenylether, bis-chloromethyl-durol, bis-chloromethyltetrachlorobenzene, 1,4 - dichlorobutene, 1,4 - dichlorobutine, dichloromethylether, dichloroethylether, dibromobutylether, dichloro - diethylsulphide, dibromodiethylsulphide, dichloro-diethylsulphone, 9,10-dichloroanthracene, cyanurchloride, tris - chlorohexylisocyanurate, adipic acid-bis-beta-bromoethyl ester, succinic acid-bis-beta-chloroethyl ester; halogen-acylated polyamines such as bis-chloroacetylhydrazine, bis - chloroacetyl-N,N' - dimethylhydrazine, methylene - bis - bromoacetamide, bis-chloroacetyl-ethylenediamine, bis - chloroacetyl - N,N' - dimethylethylenediamine, bis-chloroacetyl-piperazine, bis-bromoacetyl-tetramethylenediamine, bis - chloroacetyl-hexamethylenediamine, bis - bromoacetyl - hexamethylenediamine, bis-alpha - chloropropionyl - piperazine; bis-urethanes of diisocyanates and bromoethanol or chlorethanol such as 4,4' - methylene - bis - carbanilic acid - bis - bromoethyl ester, hexamethylene-bis-bromoethylurethane, toluylene-2,4 - bis - bromoethylurethane, toluylene-2,6-bis-bromoethylurethane, hexamethylene - bis - chloromethylphenyl-carbamic acid ester, tetramethylene - bis - chloromethyl-phenylurea etc., 1,3-dichloropropanol-2, 1,3-dibromopropanol-2, 2,2 - bis - chloromethyl-propanediol, 1,3-dichloroacetone, 1,5 - dichloroacetylacetone, 1,4-dibromo-adipodinitrile, bis - (alpha - chlorobenzylidine) - hydrazine, N,N - bis - chloroethylaniline, N,N - bis - bromoethyl-toluidine, bis-bromoethyl-alkenyl-phosphineoxide, such as hydroxyethylated vinylphosphonic acid - bromide, bis-bromoacetyl - 1,2 - phenylenediamine - carboxylic acid, 2,5 - bis - (chloroacetamido) - anisol - 4 - sodium sulphonate, trichloropentaerythritol, dibromopentaerythritol, fumaric acid-bis-beta-bromoethyl ester, bis-chloromethyl-diphenylmethane-diisocyanate, 1,3-dibromopropanol-(2)-allylether, N,N - bis - beta - bromoethylbenzenesulfonic acid-amide.

Specific compounds with a plurality of sulphonate groups are 1,3-propanediol-bis-benzene-sulphonate,
1,4-butanediol-bis-tosylate,
diethyleneglycol-bis-tosylate,
pentaerythritol-bis-benzene-sulphonate,
glycerine-bis-naphthalene-sulphonate,
p-xylyleneglycol-bis-methane-sulphonate,
octaethyleneglycol-bis-methane-sulphonate,
mannitol-hexabenzene-sulphonate,
trimethylolpropane-tris-tosylate,
hexanetriol-bis-butane-sulphonate,
dioxethyl-aniline-bis-methane-sulphonate,
dioxethyl-hydroquinone-bis-methane-sulphonate,
terephthalic acid-bis-glycol ester-bis-tosylate.

Any compound with at least two sulphonate groups may be used in the practice of this invention in conjunction to the compounds with one active hydrogen atom and one quaternizing group including sulfuric acid ester groups.

Any compound containing at least two tertiary nitrogen atoms may also be used in the practice of this invention. It is to be understood that a list including all suitable compounds would be far too long to include herein with any degree of comprehensiveness and that any compounds falling into the broad classes defined herein are operative.

If it is so desired, the major portion of the reactants may be made up of the polyfunctional compounds and polyisocyanate with as small an amount of the quaternizable compounds as 0.5 to about 5% based on the weight of the total reaction mixture. Even in such small quantities the quaternized nitrogen groups contribute sufficiently to the properties of the polyurethane to affect them favorably. Generally, however, the proportions of the reactants to be used are chosen so that the total number of the groups which can react with the isocyanate groups have a ratio with respect to the total number of isocyanate groups of from 1:0.5 to 1:2 (advantageously 1:0.9 to 1:1.3). The ratio between the tertiary amino groups and the reactive halogen atoms is preferably from 1:0.3 and 1:3 (advantageously 1:0.7 to 1:1.8).

Where compounds are used which contain at least two hydrogen atoms which are reactive with NCO groups, in conjunction with the compounds containing the quaternizable groups, it is preferable to add the latter compounds as late as possible to the reaction mass. This is especially necessary when polyhydroxy compounds of relatively high molecular weight are not used. In such a case, an excess of the polyisocyanate is initially allowed to react with chain extending compounds and then the compounds containing the quaternizing and quaternizable groups are introduced.

The quaternization reaction by which the higher molecular weight polyurethanes are prepared generally only begins at temperatures above 60° C., at which temperature the reaction accelerates and proceeds very rapidly. At lower temperatures, however, the reaction usually takes too long to complete, and for that reason, it is advantageous to carry out the quaternization at substantially high temperatures within the range of between about 60° C. to about 140° C.; any temperature higher than about 140° C. leading to a decomposition of the polymer under some reaction conditions.

It is also generally advantageous to carry out the reaction in an organic solvent such as, for example, dimethylformamide, dimethyl sulphoxide, tetramethylene sulphone, dioxane, tetrahydrofuran, methylethylketone, glacial acetic acid, and any similar solvents or mixtures thereof. Alcohols and water can also serve as the reaction medium if all of the NCO groups have been prereacted and only the quaternization reaction remains to take place. The use of the alcohols and/or the water as solvents depends, to be sure, on the solubility of the reactants in the alcohols and water. Generally, if a sufficient number of quaternary ammonium groups has already been incorporated into the reactant containing the urethane groups, it will have a sufficient degree of solubility in mediums such as alcohols and water to render them useful as solvents.

The polyurethanes prepared according to this method may be used in an unlimited number of applications, and polyurethane foams, coatings, elastomers and dispersions may easily be prepared therefrom in addition to any other form of polyurethane desired.

A polyurethane foam may be readily prepared simply by mixing the reactants in the presence of water and/or any other suitable blowing agent generally employed in the art. Some other such suitable blowing agents are, for example, low boiling hydrocarbons such as pentane, hexane, heptane, pentene, heptene and the like; azo compounds such as azohexahydrobenzodinitrile and the like, halogenated hydrocarbons such as, dichlorodifluoroethane, dichlorodifluoromethane, trichlorofluoromethane, vinylidene chloride, methylene chloride, and the like.

In the production of elastomeric polyurethanes, a polyhydroxy compound such as a polyester or polyether having a relatively high molecular weight is preferably reacted with an excess of the polyisocyanate to form a polyester or polyether isocyanate of higher molecular weight. The quaternizable monohydric alcohol or alcohols are preferably added subsequently, although the quaternizable monohydric alcohol or alcohols may also be dissolved in the polyhydroxy compound and allowed to react with the isocyanate at a high temperature, the preference for which has already been explained. Initial adducts of the type described hereinbefore as I–III may also be formed and reacted with the isocyanate while in admixture with the polyol, or all the reactants may be reacted with the polyisocyanate except the tertiary amine which is added thereafter. Any of a great variety of orders of addition may be employed including and in addition to those mentioned; however, the first method described is usually the preferred procedure. The main reason for preferring the first procedure is that the initial adducts are generally crystallized insoluble materials which are sometimes difficult to handle, and which are not required in the procedure of the first process. Even so, in order to prevent any possible disadvantageous effects due to the influence of the tertiary amine on the free isocyanate groups, it is occasionally necessary to form the initial adducts in the preparation of polyurethanes.

Whichever procedure is chosen, the reactants are mixed together and heated until the required viscosity is reached. The required viscosity depends on the molecular weight of the polyurethane and the purpose to which it is to be put. Since the viscosity of the solution of the reactants is directly related to the molecular weight of the polymer in solution, the molecular weight of the polymer may be accurately determined by relatively simple calculations given the value for the viscosity.

In the production of elastomeric polyurethane masses from the melt, but more especially in the production of elastic molded elements in the presence of an excess of isocyanate or in the presence of trifunctional components, the reaction is first allowed to continue until the mixture is suitable for casting, extruding or injection-molding. The reaction mass is then molded in the required manner and then finally heated.

To prepare aqueous polyurethane compositions, polymerization is conducted in a solvent or a solvent is added during or on completion of the reaction. For such aqueous polyurethane composition care is to be taken that the amount of quaternary ammonium groups is above 0.2% of the polyurethane composition. When the conversion is completed, i.e. when the viscosity of the solution has reached the required value, water is added to the solution and the solvent is distilled off. Polyurethanes of a more hydrophilic nature can also be dissolved directly in solvents containing 50–100% of water. Molecularly or colloidally dispersed aqueous solutions or latices may thus be obtained.

Emulsifiers, stabilizers, protective colloids, thickening agents, fillers, pigments and plasticizers can be added to these solutions as required as well as to any of the other types of polyurethanes prepared where desired. Cross-linking agents may be added to the latices, in which case cross-linking takes place in the polyurethane film formed when the dispersing medium is removed. Examples of some cross-linking agents which are suitable are sulphur sol, formaldehyde and substances which react in the manner of formaldehyde, as well as peroxides and substituted isocyanates. Water-soluble cross-linking agents such as formaldehyde, methylol compounds and their ethers may simply be added to the prepared latex, whereas the water-repellent peroxides and substituted isocyanates are preferably dissolved in a non-polar solvent which is immiscible with water and emulsified into the latex.

The products obtained by the process of this invention are suitable for many uses such as, for example, in the production of various types of molded elements by casting, injection-molding or extruding processes or by methods used in the rubber industry for the production of foils, films and filaments.

Aqueous dispersions, optionally mixed with other plastic dispersions of the same or like material, are used in the production of dipped articles, foam materials, coatings on woven and unwoven textiles, leather, paper, wood, metal, and for impregnations. They may also be used for antistatic and crease-resistant finishing of fibres and textiles, as lining agents and binding agents, as sizing agents and for the finishing of leather. Furthermore, modified polyurethane foam plastics can be produced, using either the single-stage process or the prepolymer process.

The invention is further illustrated but is not intended to be limited by the following examples in which all parts and percentages are by weight unless otherwise specified.

EXAMPLE 1

About 1000 parts of a polyester of adipic acid, hexanediol, and pentaglycol (molecular weight 1850) is melted and about 21 parts of ethylene bromhydrin and about 15 parts of dimethyl aminoethanol are added in succession. The mixture is heated to about 120° C. and then dehydrated for about 30 minutes in vacuo with the result that the melt becomes cloudily opaque. About 177 parts of doiphenylmethane diisocyanate are added at about 90° C. whereupon the mass quickly becomes highly viscous and a rise in temperature is noted. The mass is poured into boxes and heated for about 24 hours at about 100° C. A hard, rubber like material is obtained which can be worked on a rubber mixing roll. At about 80° C. the Defo hardness is about 1275 and the Defo elasticity is about 36 measured in accordance with DIN 53514. Vulcanization at about 150° C. for about 60 minutes with addition of about 30% of activated carbon black and about 8% of dicumyl peroxide provides an elastomer with the following mechanical properties:

Strength: 209 kp./cm.$^2$
Elongation at break: 510%.
Load at 300% elongation: 109 kp./cm.$^2$
Shore hardness (20° C./75° C.): 58/53
Rebound elasticity (20° C./75° C.): 48/43%
Permanent elongation after 1 min.: 8
Permanent elongation after 1 hour: 4
Tear resistance (Graves) DIN 53515 by the contact method: 42 kp./cm.

EXAMPLE 2

About 1000 parts of the polyester used in Example 1 is dehydrated for about 30 minutes at about 120° C. and about 21 parts of ethylene bromhydrin and about 177 parts of diphenylmethane diisocyanate are added in succession thereto at about 90° C. The mass is stirred until viscous, whereupon about 15 parts of dimethylaminoethanol are incorporated homogeneously by stirring. The mass is then heated in boxes for about 24 hours at about 100° C. A hard rubber-like mass is obtained, which has similar properties to the product of Example 1.

EXAMPLE 3

A mixture of about 9 parts of 1,4-butanediol, about 4 parts of 2-chloroethanol and about 4.4 parts of dimethylaminoethanol is heated to about 140° C. Quaternization takes place in an exothermic reaction. About 25.2 parts of 1,6-hexamethylene diisocyanate at a temperature of between about 160° C. and about 180° C. are slowly run into the mixture. A highly viscous melt is obtained, which provides elastic filaments.

EXAMPLE 4

To about 1000 parts of an ethylene glycol-adipic acid polyester (molecular weight 2000) which is dehydrated is added about 62.5 parts of ethylene bromohydrin and about 168 parts of 1,6-hexane diisocyanate, and the mixture is stirred for about 1 hour at about 100° C. After cooling to about 40° C., about 44.5 parts of dimethylaminoethanol is added. The melt quickly becomes highly viscous and solidifies into a waxy, friable mass. After about 15 hours at room temperature, the mass has gained considerably in strength and toughness. Heating for about eight hours at about 100° C. yields an elastic polyurethane plastic which softens at temperatures above about 120° C. and can then be shaped. Solutions in acetone-water mixtures can be transformed, by distilling off the acetone, into a colloidal aqueous solution which, on being dried, gives clear elastic films of high tensile strength.

It is to be understood that any of the compounds alluded to herein as operative for the same purpose may be substituted for its counterpart in the foregoing examples, and that although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A method for the preparation of a polyurethane which comprises reacting a first organic compound containing at least two reactive hydrogen atoms as determined by the Zerewitinoff method, a monohydric alcohol containing at least one tertiary amino group, a monohydric alcohol containing at least one member selected from the group consisting of halogen atoms and sulfuric acid ester groups, and an organic polyisocyanate.

2. A method for the preparation of a cellular polyurethane which comprises reacting a first organic compound containing at least two reactive hydrogen atoms as determined by the Zerewitinoff method, a monohydric alcohol containing at least one tertiary amino group, a monohydric alcohol containing at least one member selected from the group consisting of halogen atoms and sulfuric acid ester groups, and an organic polyisocyanate and a blowing agent.

3. A method for the preparation of a polyurethane which comprises reacting an organic compound containing at least two reactive hydrogen atoms as determined by the Zerewitinoff method; a member selected from the group consisting of dimethylaminoethanol, diethylaminoethanol, dibutylaminoethanol, N - methyl - N-butylaminoethanol, piperidionethanol, morpholinoethanol, dimethylaminopropanol, dimethylaminobutanol, 1,6-bis-dimethylamino-2-hexanol, 1,3-diethylamino - 2 - propanol, 2,2-bis-dimethylaminomethyl propanol; an organic polyisocyanate and a member selected from the group consisting of beta-chloroethanol, beta-bromoethanol, gamma-bromopropanol, 6-bromohexanol, 2-bromohexanol, 3-chlorobutanol, beta-iodoethanol, 2-iodohexanol, 3-iodobutanol, 1,3-diiodo-2-propanol, ethylene glycl monobenzene sulphonate, 1,3-dichloro-2-propanol, 1,3-dibromo-2-propanol, 2,2-bis - chloromethylpropanol, pentaerythritol - trischlorhydrin, pentaerythritol-tris-bromhydrin, chloromethyl cyclohexanol, bis-chloromethyl benzyl alcohol, 4-chloromethyl hydroxy ethyl phenol ether, pentaerythritol-tris-ethane sulphonate and glycerine-bis-toluenesulphonate.

4. The product of the process of claim 1.
5. The product of the process of claim 2.
6. The product of the process of claim 3.

References Cited

UNITED STATES PATENTS

| | | | |
|---|---|---|---|
| 3,388,087 | 6/1968 | Dieterich et al. | 260—29.2 |
| 3,395,129 | 7/1968 | Dieterich et al. | 260—77.5 |
| 2,889,366 | 6/1959 | Rudner | 260—77.5 |
| 2,955,108 | 10/1960 | Omietanski | 260—77.5 |
| 3,036,998 | 5/1962 | Rudner | 260—77.5 |
| 3,294,752 | 12/1966 | Wilkinson | 260—77.5 |

FOREIGN PATENTS

| | | |
|---|---|---|
| 1,379,133 | 10/1964 | France. |
| 1,383,252 | 11/1964 | France. |
| 880,485 | 6/1953 | Germany. |

DONALD E. CZAJA, Primary Examiner

H. S. COCKERAM, Assistant Examiner

U.S. Cl. X.R.

117—132, 138.5, 139.4, 142, 148, 155, 161; 260—77.5